(12) United States Patent
Wu et al.

(10) Patent No.: US 11,124,358 B2
(45) Date of Patent: Sep. 21, 2021

(54) ROLLER PLATFORM TRANSPORT SYSTEM

(71) Applicant: SUPER MICRO COMPUTER, INC., San Jose, CA (US)

(72) Inventors: Chinghorng (Charlie) Wu, San Ramon, CA (US); Peter Wang, Downey, CA (US)

(73) Assignee: SUPER MICRO COMPUTER, INC., San Jose, CA (US)

( * ) Notice: Subject to any disclaimer, the term of this patent is extended or adjusted under 35 U.S.C. 154(b) by 29 days.

(21) Appl. No.: 15/595,907

(22) Filed: May 15, 2017

(65) Prior Publication Data

US 2018/0050862 A1 Feb. 22, 2018

Related U.S. Application Data

(60) Provisional application No. 62/376,857, filed on Aug. 18, 2016.

(51) Int. Cl.
| | |
|---|---|
| *B65D 88/12* | (2006.01) |
| *B65D 88/54* | (2006.01) |
| *B65G 39/02* | (2006.01) |
| *B65G 7/04* | (2006.01) |
| *B65D 90/00* | (2006.01) |
| *B65D 13/00* | (2006.01) |

(52) U.S. Cl.
CPC ......... *B65D 88/129* (2013.01); *B65D 88/542* (2013.01); *B65D 88/546* (2013.01); *B65D 90/0033* (2013.01); *B65G 7/04* (2013.01); *B65G 39/025* (2013.01); *B62B 2203/74* (2013.01); *B65D 13/00* (2013.01)

(58) Field of Classification Search
CPC ......... B60P 1/52; B62B 3/04; B62B 2203/74; B65D 88/129; B65D 88/542; B65D 88/546; B65D 2519/00805; B65G 7/04; B65G 39/025; B65G 69/30; B65G 13/12
USPC ............. 414/529, 536, 531; 280/79.11, 79.3; 193/35 MD
See application file for complete search history.

(56) References Cited

U.S. PATENT DOCUMENTS

| | | | | |
|---|---|---|---|---|
| 2,305,762 | A * | 12/1942 | Cristofoletti | B60L 11/18 414/538 |
| 2,432,182 | A * | 12/1947 | Turner | B60P 1/52 108/57.15 |
| 3,690,485 | A * | 9/1972 | Fischer | B65D 88/129 108/56.1 |
| 3,850,283 | A * | 11/1974 | Nordstrom | B60P 1/52 198/313 |
| 3,937,344 | A * | 2/1976 | Montgomery | B60P 1/04 414/469 |
| 3,976,177 | A * | 8/1976 | Brown | B65G 39/025 193/37 |
| 4,018,322 | A * | 4/1977 | Brown | B65G 39/025 193/37 |

(Continued)

*Primary Examiner* — James Keenan
(74) *Attorney, Agent, or Firm* — Artegis Law Group, LLP (57) ABSTRACT

A roller platform apparatus includes a rigid plate, a set of bearings mounted on the rigid plate, and a set of one or more bars attached to the rigid plate. The set of bars is configured to restrict movement of a load into a space between the set of bearings and lower than the height of the one of more bars, and the height of the one or more bars is lower than the height of the first set of bearings and higher than the rigid plate. At least one advantage in this approach is that an equipment rack can be transported without the use of casters that are permanently attached to the equipment rack.

10 Claims, 6 Drawing Sheets

(56) References Cited

U.S. PATENT DOCUMENTS

| | | | | |
|---|---|---|---|---|
| 4,036,345 A * | 7/1977 | Webb | B60P 1/52 | 193/35 SS |
| 4,049,135 A * | 9/1977 | Glassmeyer | B65D 88/126 | 108/55.1 |
| 4,347,794 A * | 9/1982 | Nordstrom | B65D 19/38 | 108/57.15 |
| 4,787,808 A * | 11/1988 | Shimoji | B62B 3/04 | 193/35 A |
| 4,808,058 A * | 2/1989 | Carney | B60K 1/04 | 104/34 |
| 5,026,243 A * | 6/1991 | Dell | B65G 69/30 | 14/71.1 |
| 5,037,265 A * | 8/1991 | O'Brien | B65G 13/00 | 14/72.5 |
| 5,467,827 A * | 11/1995 | McLoughlin | B60P 1/6427 | 414/531 |
| 5,683,220 A * | 11/1997 | Oh | B62B 3/1476 | 414/401 |
| 5,779,428 A * | 7/1998 | Dyson | B65G 13/11 | 193/35 A |
| 5,895,193 A * | 4/1999 | Ung | B65D 88/12 | 198/832.2 |
| 6,786,318 B1 * | 9/2004 | Pace | B65G 13/12 | 193/35 MD |
| 7,063,496 B2 * | 6/2006 | Jackson | B62B 3/08 | 193/35 A |
| 7,237,667 B2 * | 7/2007 | Marcelli | B60P 1/52 | 193/35 SS |
| 8,851,488 B2 * | 10/2014 | Carruyo | B60P 7/08 | 280/79.11 |
| 9,238,551 B2 * | 1/2016 | Kalitta | B65G 39/12 | |
| 9,327,952 B1 * | 5/2016 | Kolharkar | B66F 9/127 | |
| 9,809,241 B2 * | 11/2017 | Polidoros | B62B 3/04 | |
| 9,994,244 B2 * | 6/2018 | Churchvara | B62B 3/02 | |
| 2004/0247422 A1 * | 12/2004 | Neumann | B65D 88/129 | 414/529 |
| 2005/0226706 A1 * | 10/2005 | Thomas | B60P 1/38 | 414/467 |

\* cited by examiner

ROLLER PLATFORM TRANSPORT SYSTEM

CROSS-REFERENCE TO RELATED APPLICATIONS

This application claims the benefit of the U.S. provisional patent application having Ser. No. 62/376,857, filed on Aug. 18, 2016. The subject matter of this related application is hereby incorporated herein by reference.

BACKGROUND OF THE INVENTION

Field of the Invention

Embodiments of the present invention relate generally to transport systems systems, and, more specifically, to a roller platform transport system design and function.

Description of the Related Art

Loaded equipment racks generally include multiple pieces of electronic equipment, such as servers, that are pre-assembled into an equipment rack, cabled, and tested at a manufacturing or system integration facility. After assembly, cabling, and testing, the loaded equipment racks are shipped to a facility, such as a data center, where multiple loaded equipment racks operate in concert to perform various data processing operations. When the loaded equipment racks arrive at the facility, each rack has to be moved into a specified location within a rack frame, where the rack frame has openings for each of the loaded equipment racks.

Loaded equipment racks are heavy and difficult to move. As one example, a loaded equipment rack that is 30 rack units (RU) high could weigh between 1000 and 2500 pounds with a typical weight of 1600 pounds. Such equipment racks cannot be moved easily at the factory or at the facility. Therefore, the loaded equipment racks are typically fitted with wheels or casters that are mounted at the bottom of the rack. The casters allow the racks to be rolled off the shipping crate, through the facility and into the proper location in the rack frame. This conventional solution suffers from the drawback that the casters increase the vertical height of the rack by the height of the caster and mounting bracket assembly. Once the loaded equipment rack is installed into the rack frame, the casters serve no purpose. However, the casters still take up vertical space. This increase in height is undesirable in high density data centers, where equipment racks are installed into rack frames that have two levels, where one level is stacked above the other level. With such rack frames, the opening for each rack is sized to accommodate only the vertical height of the rack frame without casters in order to increase the vertical density of the rack frames.

Alternatively, empty equipment racks could be shipped to the facility along with the separate pieces of equipment and cabling to be installed at the facility. The empty equipment rack would have to be moved into place within the rack frame, each piece of equipment would then be installed into the rack, and the equipment would be cabled and tested onsite. However, with this alternative approach, packing and shipping the rack and separate pieces of equipment would significantly increase the cost of shipping. Further, the time to install, cable, and test the equipment onsite would be several hours per rack, significantly increasing the time to install the equipment at the facility.

As the foregoing illustrates, what is needed in the art are more effective techniques for transporting loaded equipment racks.

SUMMARY OF THE INVENTION

One embodiment of the present invention sets forth a method of transporting an equipment rack including, after one or more components have been installed into the equipment rack, enclosing the equipment rack in a shipment container and, during removal of the equipment rack from the shipment container, reducing friction between the equipment rack and an floor of the shipment container by supporting the weight of the equipment rack on a first set of bearings.

At least one advantage of this approach is that the installation and testing of components in the equipment rack can be performed prior to transporting the loaded and tested equipment rack to the installation premises where the equipment rack is to be installed. This reduces the amount of time during which the installation process occupies space, personnel, and other resources at the installation premises, which can interfere with the normal operations of a datacenter or other computing resources at the premises. As an example, an installation time of over three hours (for loading components into the equipment rack, cabling and testing the components, and installing the loaded equipment rack) could be reduced to 20 minutes at the installation premises, since the loading, cabling, and testing of components can be performed offsite.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
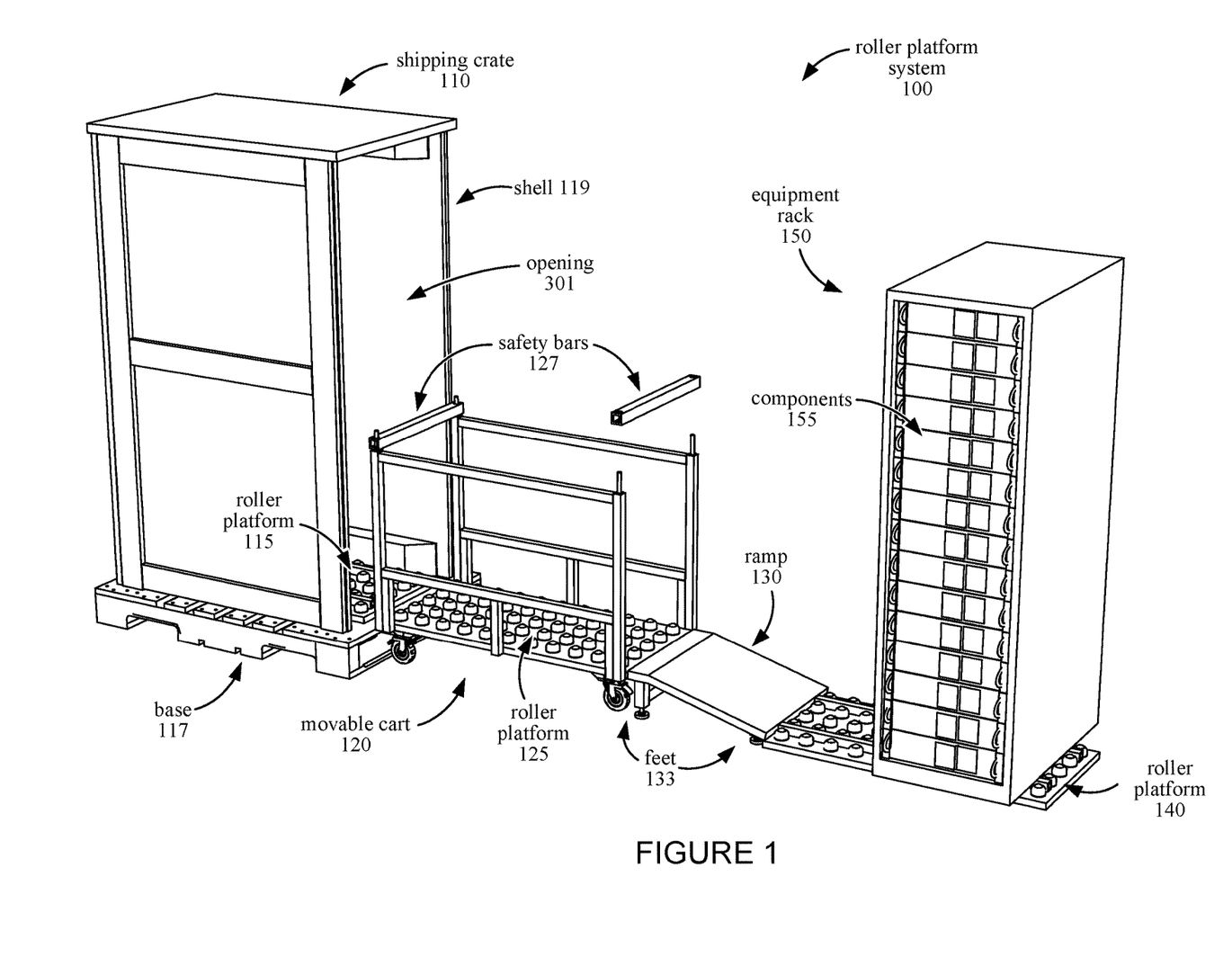
FIG. 1 is a conceptual drawing illustrating a roller platform system configured for transporting an equipment rack, according to various embodiments of the present invention.

FIG. 1 is a conceptual drawing illustrating a roller platform system 100 configured for transporting an equipment rack 150, according to various embodiments of the present invention. The system 100 includes, without limitation, a shipping crate 110 with a low profile roller platform 115, a movable cart 120 with an integrated roller platform 125, an adjustable skid ramp 130, and one or more additional roller platforms 140.

The loaded equipment rack 150 is 30 rack units (RU) high and weighs between 1000 and 2500 pounds, with a typical weight of 1600 pounds. The equipment rack 150 has a depth of 44.5 inches, a width of 20.0 inches, and a height of 53.0 inches. Accordingly, a footprint of the equipment rack is 44.5 inches×20.0 inches. Components 155 installed in the equipment rack 150 may include rack-mounted servers, power supplies, or other computer equipment. In alternative embodiments, the equipment rack may vary in dimensions, weight, number of installed components, or other characteristics.

The roller platform system 100 includes a shipment container such as shipping crate 110 having suitable interior dimensions for containing the equipment rack 150. The shipping crate 110 is configured to enclose the equipment rack 150 after installation of one or more components 155 in the equipment rack 150. For example, the installation of components 155 could increase one or more of the outside dimensions, such as the depth, of the loaded equipment rack 150. Thus, the interior dimensions of the shipping crate 110 are sized to accommodate the dimensions of the loaded equipment rack 150, rather than the dimensions of an empty equipment rack.

The shipping crate 110 is constructed from a shell 119 attached to a base 117. The shell 119 provides the top and sides of the shipping crate 110. As illustrated in FIG. 1, the shell 119 has one vertical side removed, providing an opening 301 into the interior space of the shipping crate 110. The remaining vertical side can be attached to the shell 119 to close the opening 301, thus enclosing the interior space of the shipping crate 110. The bottom edges of the shell 119 are attached to the base 117. The base 117 is a pallet that provides a rigid upper surface and a supporting structure with slots into which blades of a forklift, pallet jack, front loader, or other lifting device can be inserted for lifting the pallet. The shell 119 and the base 117 of the shipping crate 110 are constructed from wood. In alternative embodiments, some or all of the parts of shipping crate 110 may be constructed from other materials, such as plastic or metal.

Roller platform 115 is appropriately sized to fit inside the shipping crate 110. In particular, the length and width of the roller platform 115 are less than the length and width, respectively, of the interior floor of the assembled shipping crate 110, so that the roller platform 115 can be positioned on the base 117 and inside the shipping crate 110 between the walls of the shell 119. As illustrated in FIG. 1, the roller platform 115 covers substantially all of the interior floor of the shipping crate 110, while leaving sufficient margin around the edges of the roller platform 115 so that the roller platform 115 can be easily removed from the shipping crate 110. In alternative embodiments, the roller platform 115 covers a smaller fraction of the interior floor. The interior floor of the shipping crate 110, as illustrated in FIG. 1, is the top surface of the base 117 that is exposed within the interior space of the shipping crate 110, and defines the maximum footprint of a payload, such as the equipment rack 150, that can fit inside the shipping crate 110. Accordingly, the roller platform 115 also corresponds in size to the footprint of the equipment rack 150. In addition, the height of the roller platform 115 is less than a difference between the height of the interior space within the shipping crate 110 and the height of the equipment rack 150 so that the roller platform 115 and the equipment rack 150 can be enclosed together within the interior of the shipping crate 110, with the equipment rack 150 being supported on top of the roller platform 115. An exemplary roller platform 115 is 2.5 inches in height.

The overall dimensions of the roller platform 115 are selected to fit in an aisle between two adjacent rack frames at the installation premises. As one example, the distance between two adjacent rack frames at the installation premises could be approximately 5 feet.

Figure 2:
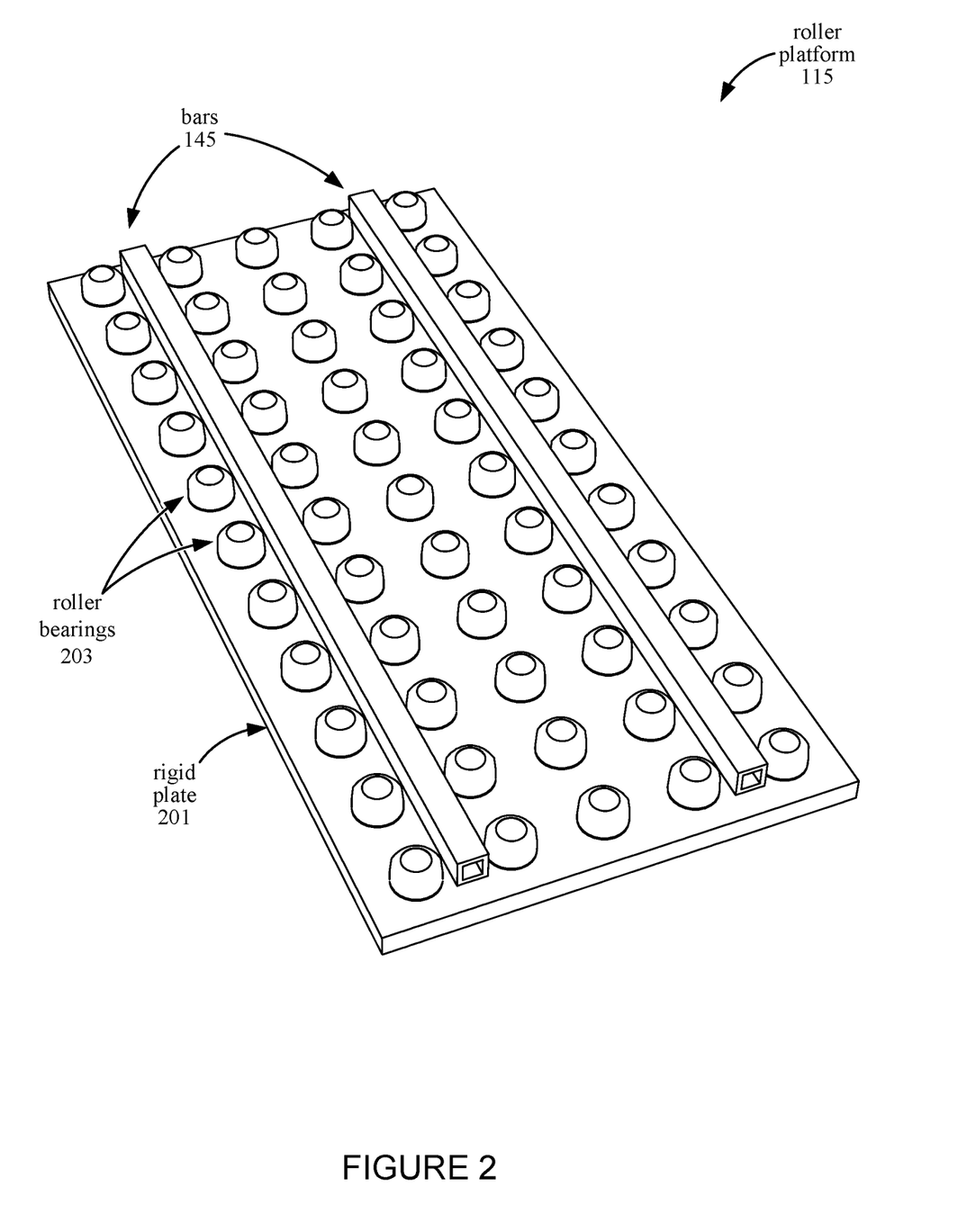
FIG. 2 is a more detailed conceptual drawing of the roller platform of FIG. 1 configured for facilitating transport of an equipment rack, according to various embodiments of the present invention.

FIG. 2 is a conceptual diagram illustrating additional features of the roller platform 115, which is configured for facilitating transport of an equipment rack 150, according to various embodiments of the present invention. The roller platform 115 includes, without limitation, a set of roller bearings 203 mounted on a rigid plate 201 and a set of bars 145 mounted on the rigid plate 201 between the roller bearings 203.

The rigid plate 201 is constructed from a welded stainless steel frame covered by a stainless steel sheet. The roller bearings 203 fastened to the stainless steel sheet by threaded fasteners penetrating the steel sheet. In alternative embodiments, the rigid plate 201 may be a single piece of solid material such as metal, plastic, wood, etc., and/or the roller bearings 203 may be welded, bonded, or otherwise attached to the rigid plate 201.

The roller bearings 203 are omnidirectional ball transfer bearings. Each bearing 203 includes a load-bearing spherical ball mounted inside a housing that restricts translation of the ball while allowing free rotation of the ball around any axis. Inside the housing, the spherical ball rests on multiple smaller ball bearings in order to minimize friction when the spherical ball rotates.

The housings of roller bearings 203 are attached to the rigid plate 201 so that the balls are in an upward-facing orientation to support a load resting on top of the roller platform 115. When the weight of the load is being supported on the roller bearings, 203, the free rotation of the balls allows the load to be moved in any direction parallel to a plane defined by the tops of the roller bearings 203.

In general, a roller platform such as roller platform 115 includes at least three roller bearings 203 defining a plane on which weight distributed over a flat surface, such as the bottom surface of the equipment rack 150, can be stably supported. At least three of the roller bearings 203 are positioned on the roller platform 115 so that the center of gravity of the equipment rack 150 is located over an area bounded by the bearings 203 when the equipment rack 115 is inside the shipping crate 110 and resting on top of the roller platform 115.

As illustrated in FIG. 2, the roller platform 115 includes 55 roller bearings 203, arranged in eleven rows and five columns. A roller platform 115 matching the footprint of the equipment rack 150 has a width of 20.0 inches and a length of 44.5 inches. Accordingly, for eleven rows of bearings 203 across a length of 44.5 inches, the row pitch is 4.05 inches. For five columns of bearings 203 across a width of 20.0 inches, the column pitch is 4.00 inches.

The spacing of the roller bearings 203 on the roller platform 115 is selected so that the bearings 203 are able to bear the full weight of the loaded equipment rack 150 even if the loaded equipment rack 150 bears on only a portion of the roller platform 115, as can occur during transfer of the equipment rack 150 onto or off of the roller platform 115. Each roller bearing 203 has a bearing capacity of 300 pounds, such that two rows of roller bearings 203, with five roller bearings 203 per row, have a bearing capacity of 3000 pounds. The roller platform 115, having 55 bearings 203 each capable of supporting 300 pounds, can support a maximum evenly distributed weight of 16,500 pounds, with a load bearing capacity of 18.5 pounds per square inch. In addition, the spacing of the roller bearings 203 on the roller platform 115 is selected to prevent the loaded equipment rack 150 from getting caught between adjacent rows or columns of rollers due to tipping or flexing of the rigid plate 201 or of the equipment rack 150.

In various embodiments a set of metal bars or tubes 145 are attached to the rigid plate 201, each between two adjacent columns of roller bearings 203. The longitudinal axes of bars 145 are parallel with the longitudinal axis (parallel to the long edge) of the rigid plate 201, and are aligned with the direction of the columns of bearings 203. While roller platform 115 is illustrated as having two bars 145 positioned between the first and second columns and between the fourth and fifth columns of bearings 203, alternative embodiments may include fewer or more than two bars 145, each of which can be located in between any pair of adjacent columns of bearings 203 or at the edges of the rigid plate 201. Alternative embodiments may also include one or more bars similar to bars 145 but having longitudinal axes aligned with the crosswise axis (parallel to the short axis) of the rigid plate 201, or having longitudinal axes not parallel to either the longitudinal or the crosswise axes of the rigid plate 201.

The set of bars 145 is configured to restrict movement of any portion of the equipment rack 150 into a space between the bearings 203 and below the height of the set of bars 145, while still allowing the equipment rack 150 to be moved over the bearings 203. Thus, the height of the metal bars or tubes 145 may be selected to be slightly less than the height of the roller bearings 203. In one embodiment, the height of the bars 145 is selected to be higher than the housings of the roller bearings 203 and lower than the tops of the spherical balls of the bearings 203. The metal bars or tubes 145 thus protect the loaded equipment rack 150 from tipping or getting caught between adjacent rows of roller bearings 203, while providing additional strength and stiffness to the rigid plate 201. For this reason, the longitudinal axes of bars 145 are aligned along an expected direction of travel of the equipment rack 150, such as a direction in which the equipment rack 150 is to be removed from the shipping crate 110.

Figure 3:
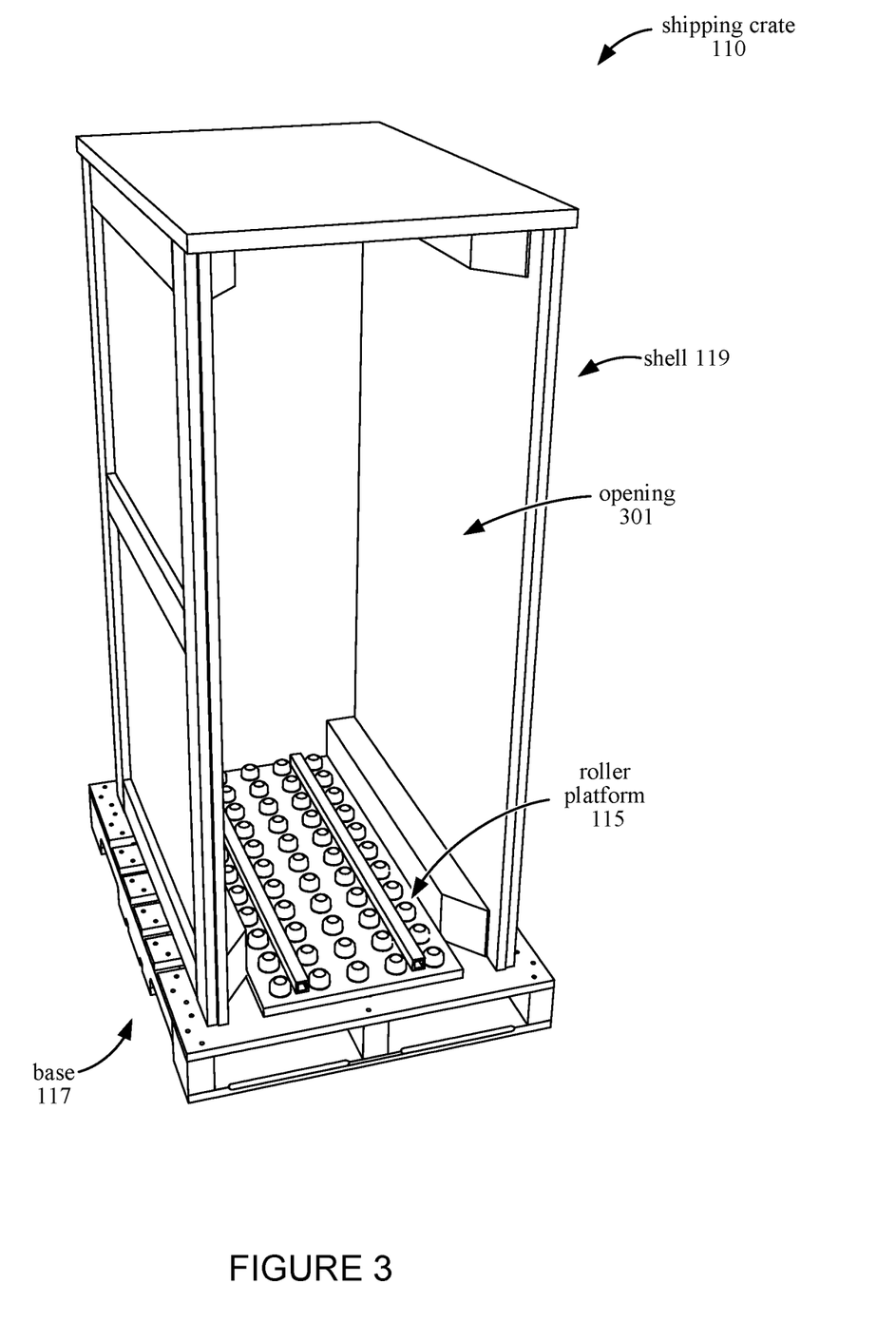
FIG. 3 is a conceptual drawing of the shipping crate of FIG. 1 configured for enclosing an equipment rack, according to various embodiments of the present invention.

FIG. 3 is a conceptual diagram illustrating a shipping crate 110 configured for enclosing an equipment rack 150, according to various embodiments of the present invention. FIG. 3 also illustrates the placement of roller platform 115 inside the shipping crate 110. The roller platform 115 is positioned on the interior floor of the shipping crate 110, on top of the base 117 and between the walls of the shell 119 of the shipping crate 110. The roller platform 115 substantially covers the largest rectangular portion of the interior floor that is not covered by other structures of the shell 119, except for leaving sufficient space between the edges of the roller platform 115 and the shell 119 so that the roller platform 115 can be easily removed by hand from inside the shipping crate 110.

When in position inside the shipping crate 110, the roller platform 115 has its longitudinal axis extending toward an opening 301 of the shipping crate 110, so that the longitudinal axes of bars 145 are aligned with a direction of the removal of the equipment rack 150 from inside the shipping crate 110 through the opening 301. The roller platform 115 thus reduces friction between the equipment rack 150 and the interior floor of the shipping crate 110 during removal of the equipment rack 150 from the shipping crate 110 by supporting the weight of the equipment rack 150 on the omnidirectional ball transfer bearings of the roller platform 115.

Referring back to FIG. 1, the roller platform system 100 may include a set of one or more roller platforms in addition to roller platform 115, such as roller platform 140. In one embodiment, the roller platform 140 may be constructed according to the same specifications as roller platform 115 and may be interchangeable with roller platform 115. Roller platform 115 is removable from the shipping crate 110 and can be used in conjunction with roller platform 140 to facilitate the movement of equipment rack 150 over longer distances after removal of the equipment rack 150 from the shipping crate 110.

For example, either of the roller platforms 115 and 140 can be positioned in the next segment of a desired path while the equipment rack 150 is supported by the other roller platform. Then the equipment rack can be rolled onto the newly positioned roller platform. This process can be repeated, alternating between the two different roller platforms 115 and 140, to move the equipment rack 150 over longer distances.

Figure 4:
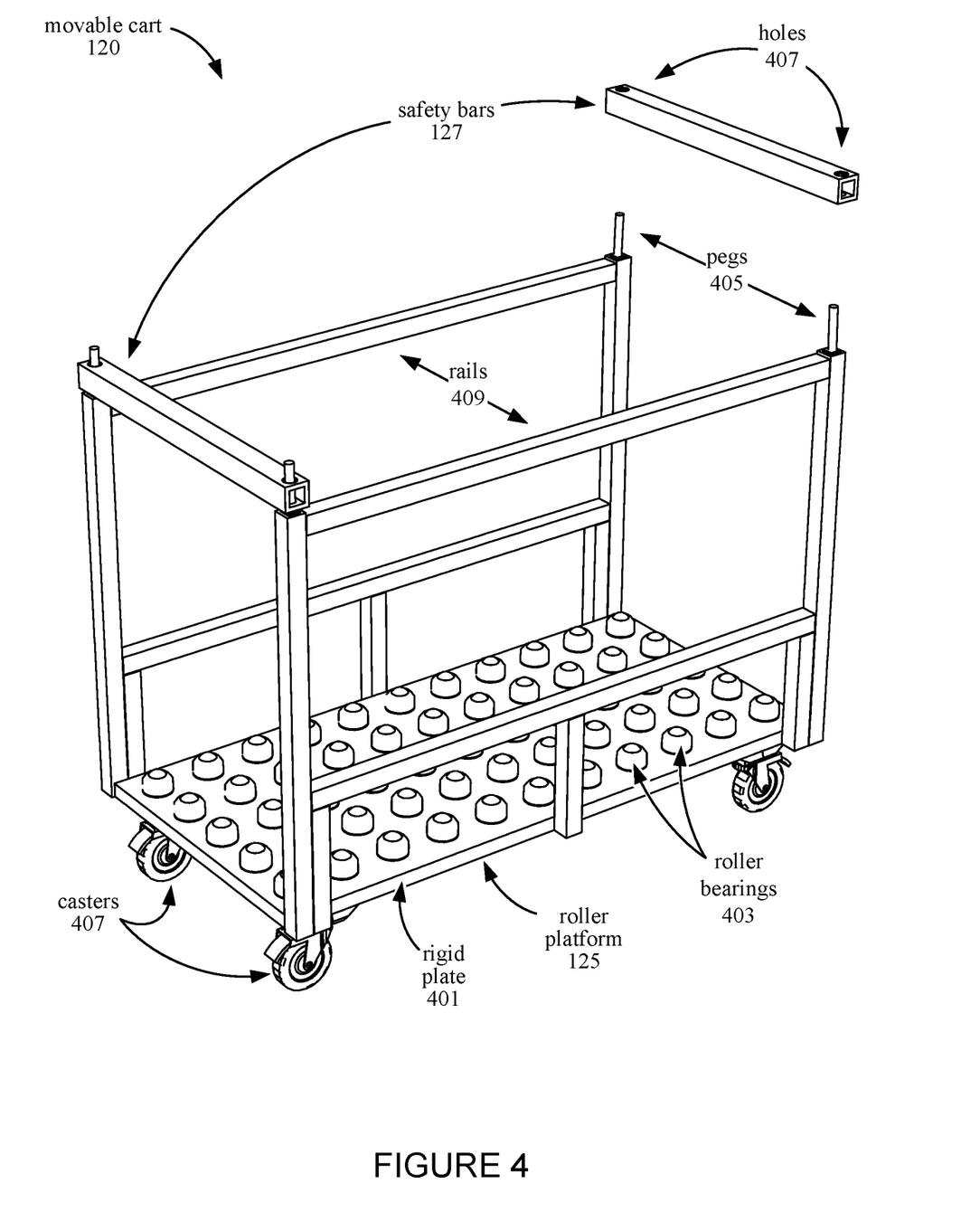
FIG. 4 is a more detailed conceptual drawing of the movable cart of FIG. 1 having an integrated roller platform configured for transporting an equipment rack, according to various embodiments of the present invention.

FIG. 4 is a conceptual drawing illustrating a movable cart 120 having an integrated roller platform 125 configured for transporting an equipment rack 150, according to various embodiments of the present invention. Similar to roller platform 115 and 140, the integrated roller platform 125 includes a set of roller bearings 403 attached to a rigid plate 401. In addition, roller platform 125 is constructed according to similar specifications (in terms of dimensions, number of roller bearings, etc.) as the roller platforms 115 and 140, but is additionally attached to rails 409 and casters 407 and may be constructed with or without bars between the roller bearings 403.

The set of casters 407 includes four casters each attached at one corner of the roller platform 125. When a load, such as equipment rack 150, is being carried by the movable cart 120, the weight of the load is transferred to the floor through the roller bearings 403, the rigid plate 401, and then the casters 407, respectively. The roller bearings 403 reduce friction between the equipment rack 150 and the rigid plate 401 so the equipment rack 150 can be easily moved onto or off of the movable cart 120 by hand. The casters 407 support the weight of the movable cart 120 and the equipment rack 150 and reduce friction between the movable cart 120 and the floor, so that the movable cart 120 can be used to move the equipment rack 150 over the floor. For example, the equipment rack 150 can be loaded from the shipping crate 110 onto the movable cart 120 and the movable cart 120 used to transport the equipment rack 150 closer to an installation location in the premises. In alternative embodiments, other types of wheels or bearings can be used in place of casters 407.

The movable cart 120 also includes a set of rails 409 that restrict movement of the equipment rack 150 relative to the rigid plate 401 in a direction perpendicular to the longitudinal axis of the cart 120 when the equipment rack 150 is on the integrated roller platform 125. Removable safety bars 127 can also be installed to further restrict movement of the equipment rack 150 in a direction parallel to the longitudinal axis. Together, the rails 409 and safety bars 127 prevent the equipment rack 150 from rolling off the movable cart 120, particularly when equipment rack 150 is being transported on the movable cart 120.

One or both of the safety bars 127 can be removed to provide a path for the equipment rack 150 to be loaded onto or off of the movable cart 120. Each of the safety bars 127 has a hole at each end that is configured to receive one of the pegs 405 at the tops of the rails 409. When installed, the safety bars 127 also reduce flexing of the rails 409 toward or away from each other.

Referring back to FIG. 1, the roller platform system 100 also includes an adjustable ramp 130. The feet 133 of ramp 130 are located at the corners of ramp 130 and can be used to adjust the height at either end of the ramp 130. As illustrated, the feet 133 are adjusted so that one end of the ramp 130 has a height equal to the height of the roller platforms 115 and 125, while the other end of the ramp 130 has a height equal to the height of the roller platform 140. Thus, the ramp 130 can be used to lower a load, such as equipment rack 150, from a higher location inside the shipping crate 110 or on the movable cart 120 to a lower location on a roller platform 140 outside the shipping crate 110. Once in the lower position, the equipment rack 150 can be more easily moved into a low installation location near the floor of the premises, such as the lowest level of a multi-level rack frame.

Figure 5:
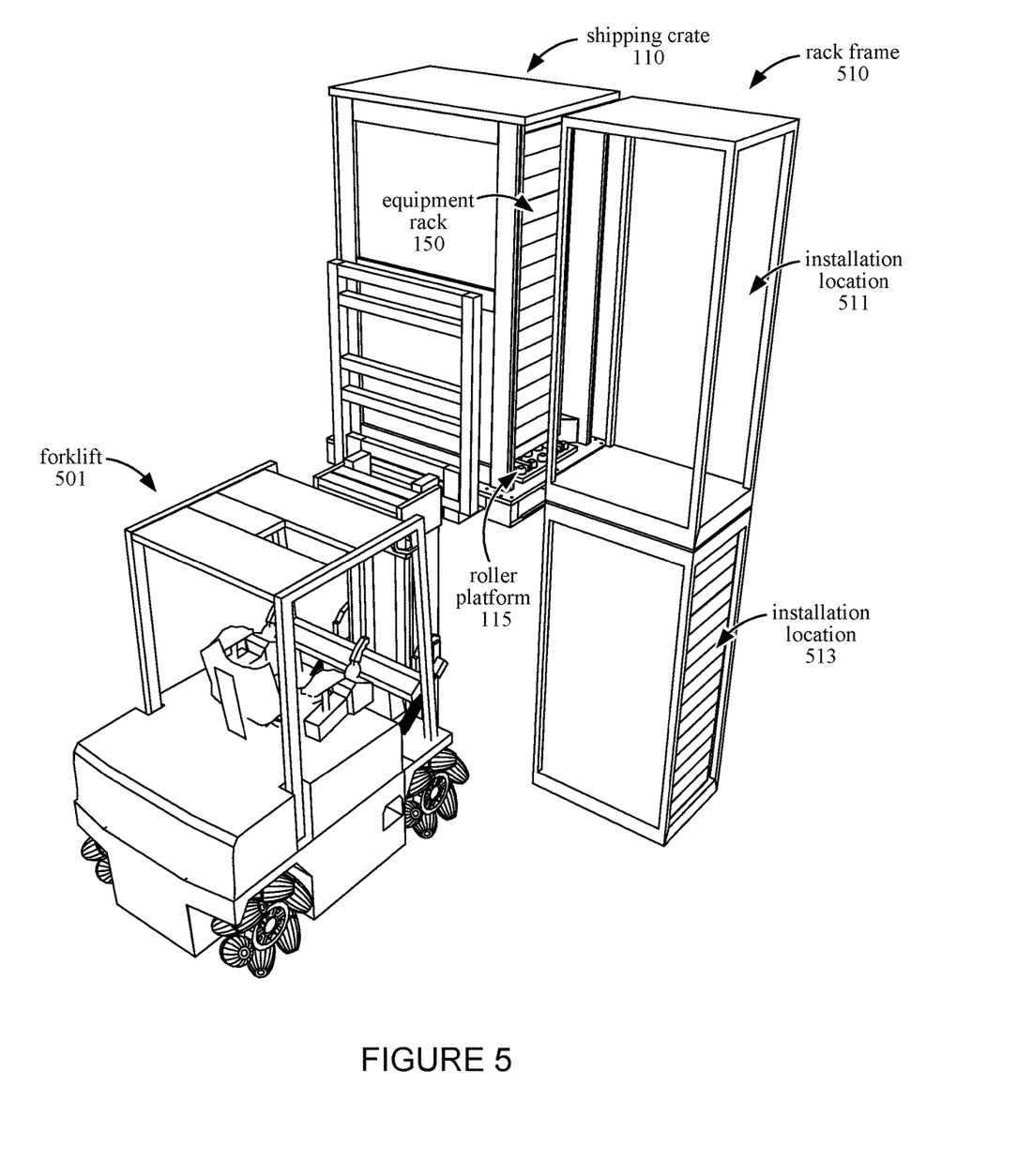
FIG. 5 is a conceptual drawing showing how the equipment rack of FIG. 1 is lifted for installation in an elevated position, according to various embodiments of the present invention.

FIG. 5 is a conceptual drawing illustrating lifting an equipment rack 150 for installation in an elevated position, according to various embodiments of the present invention. A forklift 501 is used to elevate the equipment rack 150 to the height of an installation location 511. The installation location 511 is located in an upper level of a two-level rack frame 510, above a lower installation location 513 in the lower level of rack frame 510. As illustrated in FIG. 5, an equipment rack is already installed in the installation location 513. The rack frame 510 may be one of several rack frames in a row of rack frames; however, the adjacent rack frames in the row are omitted from the illustration for clarity.

The forklift 501 elevates the loaded equipment rack 150 while the equipment rack 150 is still contained within the shipping crate 110. Once the equipment rack 150 inside the crate 110 is sufficiently close to the height of the installation location 511, the equipment rack 150 is removed from the shipping crate 110 and into the installation location 511. During this process, the roller platform 115 reduces friction between the equipment rack 150 and the interior floor of the shipping crate 110, thus reducing the force used for sliding the equipment rack 150 from the shipping crate 110 into the installation location 511. In alternative embodiments, the shell 119 of the shipping crate 110 is removed prior to elevating the equipment rack 150 on the remaining roller platform 115 and base 117 of the shipping crate 110.

Alternatively, the forklift 501 can be used to elevate the loaded equipment rack 150 while the equipment rack 150 is on the movable cart 120. Once the equipment rack 150 on the movable cart 120 has been elevated to the height of the installation location 511, the safety bar 127 between the equipment rack 150 and the installation location 511 can be removed to provide a path for the equipment rack 150 to be moved from the cart 120 into the installation location 511. The equipment rack 150 can then be moved into the installation location 511. During this process, the roller bearings 403 reduce the friction between the bottom of the equipment rack 150 and the rigid plate 401, in turn reducing the force used for sliding the equipment rack 150 from the movable cart 120 into the installation location 511.

In alternative embodiments, a lifting device other than a forklift 501 can be used to elevate the equipment rack 150. For example, a pallet jack, front loader, or other lifting device can be used in place of forklift 501.

Figure 6:
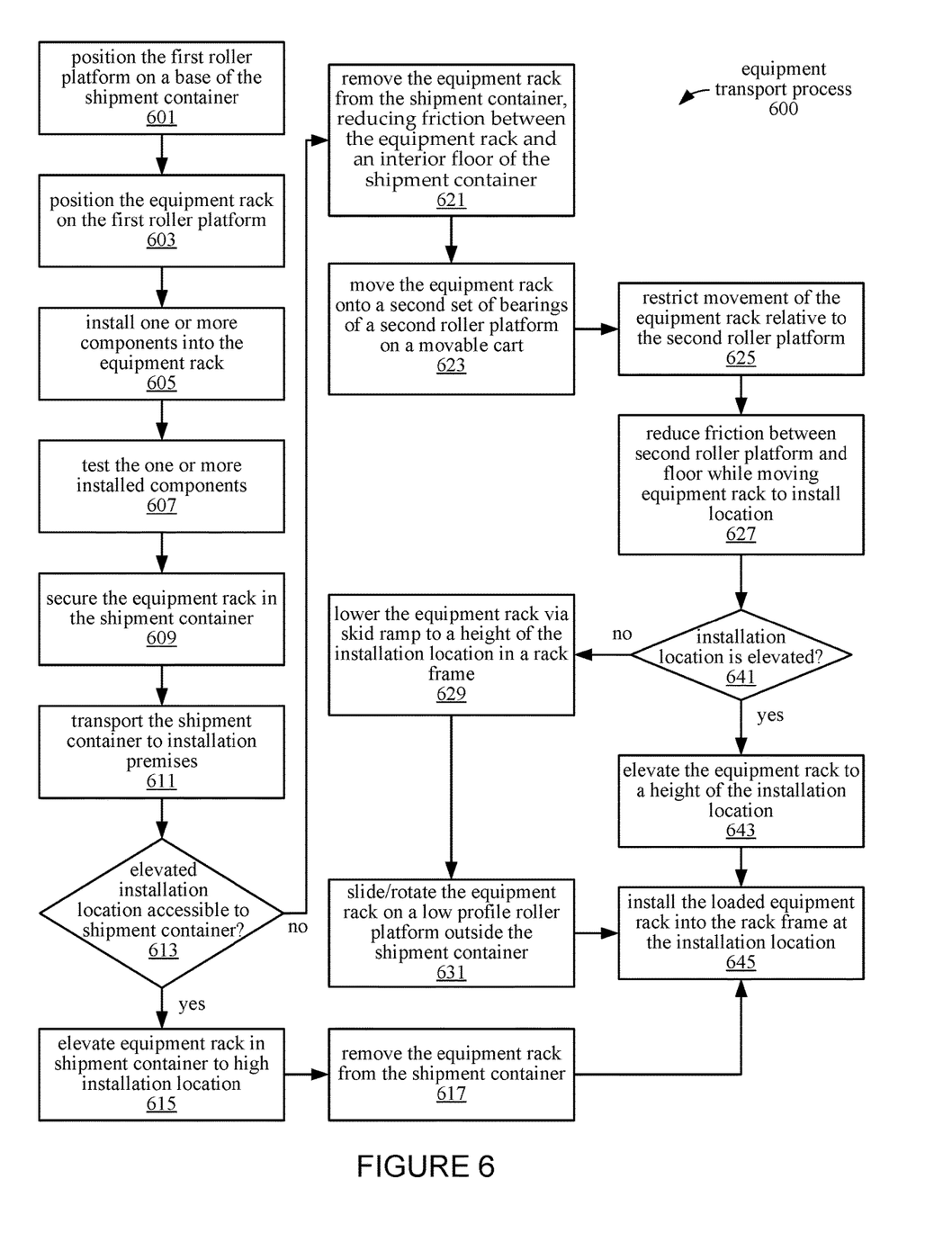
FIG. 6 is a flow diagram of method steps for transporting an equipment rack using a roller platform system, according to various embodiments of the present invention.

FIG. 6 is a flow diagram of method steps for transporting an equipment rack 150 using the roller platform system 100 illustrated in FIG. 1, according to various embodiments of the present invention. The steps in the equipment transport process 600 may be performed by one or more human or mechanical operators, by components of the roller platform system 100, or by the one or more operators using components of the roller platform system 100 or additionally using other equipment. In one embodiment, the process 600 begins at a manufacturing or system integration facility for manufacturing or assembling the equipment rack 150 and its components 155.

In step 601, an operator positions the low profile roller platform 115 on the base 117 of the shipping crate 110. The roller platform 115 is positioned on a portion of the top surface of the base 117 that becomes the interior floor of the shipping crate 110 after assembly of the shipping crate 110 is completed. Next, in step 603, the operator positions the unloaded equipment rack 150 on top of the roller platform 115. The weight of the unloaded equipment rack 150 is supported on the roller bearings 203 of the roller platform 115.

In step 605, the operator installs one or more of the components 155 into the equipment rack 150. The components 155 may include computer hardware such as servers, power supplies, or other devices. In step 607, the components 155 are cabled, then tested to verify proper operation and connection of the components 155.

In step 609, the equipment rack 150 is secured in the shipping crate 110. In one embodiment, securing the equipment rack 150 in the shipping crate 110 includes placing the shell 119 of the shipping crate 110, including the top and all four sides, over the equipment rack 150 and the roller platform 115, then fastening the sides of the shell 119 to the base 117. In an alternative embodiment, separate pieces of the shell 119 may be assembled in place around the equipment rack 150 and the roller platform 115 and fastened to each other and to the base 117.

In an alternative embodiment, the shell 119 may be fastened to the base prior to placing the equipment rack 150 inside the shipping crate 110 and on the roller platform 115, and one or more openings, such as opening 301, may be left in the shell 119 to provide a path for moving the equipment rack 150 into the shipping crate 110. Accordingly, securing the equipment rack 150 in the shipping crate may include installing a final side of the shell 119 to close the opening 301, thus enclosing the equipment rack 150 inside the shipping crate 110.

In alternative embodiments, other types of shipment containers may be used in place of shipping crate 110. For example, a rigid container made of a durable material such as plastic or metal may be used to enclose the equipment rack 150. Alternatively, a shipment container made from more pliable materials may be used if rigidity is not required, or the shipment container may consist of padding, plastic, or other material sufficient to contain the equipment rack 150. The shipment container is thus not limited to a particular form, but at least secures the equipment rack 150 to restrict physical movement of the equipment rack 150 relative to the roller platform 115 and/or the base 117.

In step 611, the secured shipping crate 110 is transported from the manufacturing facility to installation premises, which is a facility at which the equipment rack 150 will be installed. The installation premises may be, for example, a building that houses a datacenter including a rack frame 510 in which the loaded equipment rack 150 is to be installed. For transportation to installation premises in a facility remote from the manufacturing facility, the shipping crate 110 may be loaded onto a truck or other vehicle to be transported to the installation premises. In an alternative embodiment, the shipping crate 110 is transported to be installed in another location in the same building as the manufacturing facility instead of to a different building, and can be transported using a forklift, pallet jack, or other conveyance.

If, in step 613, the installation location is elevated and is accessible to the shipping crate 110 (e.g., the installation location can be reached by a forklift 501 carrying the shipping crate 110), then the process 600 continues at step 615. In alternative embodiments, whether the process 600 continues at step 615 or step 621 may depend on other factors, such as safety, availability of a movable cart 120, or operator preference.

In step 615, an operator uses the forklift 501 to elevate the equipment rack 150 to the elevated installation location, such as installation location 511 in rack frame 510, as illustrated in FIG. 5. In one embodiment, the forklift 501 is used to elevate the entire shipping crate 110 with the equipment rack 150 and roller platform 115 inside. Alternatively, some or all of the shell 119 of the shipping crate 110 may be removed prior to elevating the equipment rack 150. The forklift 501 is used to position the equipment rack 150 in front of the installation location 511. In step 617, the equipment rack 150 is then removed from the shipping crate 110 and transferred from the roller platform 115 in the shipping crate 110 to the installation location 511 in the rack frame. In one embodiment where the shell 119 of shipping crate 110 is not completely removed prior to elevating the equipment rack 150, one side of the shell 119 is removed to provide an opening 301 through which the equipment rack 150 is moved into the installation location 511.

In step 645, the loaded equipment rack 150 is installed into the rack frame 510 at the elevated installation location 511. Installation may include fastening the equipment rack 150 to the rack frame 510, connecting cables to the components 155 in the equipment rack 150, and testing the installed equipment rack 150 to verify proper connection and operation of the components 155.

If, at step 613, the installation location is not elevated or the installation location is elevated and is not accessible to the shipping crate 110, then the process 600 continues at step 621. As previously stated, whether the process 621 continues at block 615 or step 621 may depend on factors other than the height and accessibility of the installation location.

At step 621, the equipment rack 150 is removed from the shipping crate 110. Removal of the equipment rack 150 from the shipping crate 110 includes detaching some or all of the shell 119 of the shipping crate 110 from the base 117, then sliding the equipment rack 150 on the roller platform to move the rack 150 off the base 117 of the shipping crate 110. In one embodiment, the shell 119 is removed as a single piece without detaching any of the four sides and top from each other. Alternatively, an opening 301 may be created in the shipping crate 110 by removal of at least one of the sides of the shell 119 so that the equipment rack 150 can be transported off the base 117 through the resulting opening 301.

During the removal 621 of the equipment rack 150 from the shipping crate 110, the roller platform 115 reduces friction between the equipment rack and the floor of the shipping crate 110 by supporting the weight of the equipment rack 150 on its roller bearings 203. Also during the removal 621 of the equipment rack 150, the bars 145 of the roller platform 115 restrict intrusion of any portion of the equipment rack 150 into a space between the roller bearings 203 and below a height of the bars 145. For example, the bars 145 could prevent an edge of the equipment rack 150 from intruding too far into a space between the bearings 203 due to tilting of the equipment rack 150 or flexing of the equipment rack 150 or the roller platform 115, thus further ensuring that the equipment rack 150 can be moved freely over the roller platform 115.

In step 623, the equipment rack 150 is moved off the roller platform 115 and onto a second set of bearings 403 of a second roller platform 125, which is integrated in a movable cart 120. The height of the roller platform 125 in the movable cart 120 is designed to match the height of the roller platform 115 in the shipping crate 110 to accommodate transfer of the loaded equipment rack 150 onto the movable cart 120. In step 625, the movement of the equipment rack 150 is restricted relative to the roller platform 125. With reference to FIG. 4, the safety bars 127 are installed by placing each of the safety bars 127 on the rails 409 so that the pegs 405 are inserted into the holes 407 of the safety bars 127. The safety bars 127 and the rails 409 together restrict the movement of the equipment rack 150 relative to the roller platform 125 and prevent the equipment rack 150 from tipping and from sliding off the movable cart 120.

In step 627, the casters 407 mounted underneath the roller platform 125 support the weight of the roller platform 125 and the equipment rack 150 in order to reduce friction between the roller platform 125 and the floor of the premises while the equipment rack 150 is being moved on the cart 120 to the installation location. The casters 407 allow the movable cart 120, loaded with the equipment rack 150, to be moved by hand. Alternatively, the movable cart 120 can be moved with the aid of a forklift or other conveyance.

If, at step 641, the installation location is elevated (such as installation location 511 illustrated in FIG. 5), then in step 643 a forklift 501 or other lifting device is used to elevate the equipment rack 150 to the height of the installation location. The equipment rack 150 is elevated while still loaded on the movable cart 120. Accordingly, the forklift 501 elevates the movable cart 120 along with the equipment rack 150 so that the tops of the bearings 403 of the movable cart 120 and the bottom of the equipment rack 150 are the same height as the bottom of the installation location 511.

In step 645, the equipment rack 150 is moved into the installation location 511 and installed. For an equipment rack 150 that has been lifted to the height of the installation location 511 on a movable cart 120, one of the safety bars 127 between the equipment rack 150 and the installation location is removed to provide a path for moving the equipment rack 150 from the movable cart 120 into the installation location 511. The equipment rack 150 is then moved into the installation location 511 by sliding the equipment rack 150 over the bearings 403 of the roller platform 125. The bearings 403 facilitate the movement of the equipment rack 150 off the roller platform 125 and into the installation location 511 by reducing friction between the bottom of the equipment rack 150 and the rigid plate 401. Once the equipment rack 150 is in the elevated installation location 511, the equipment rack 150 is fastened to the rack frame 510, the components 155 of the equipment rack 150 are connected with cables, and the installed equipment rack 150 is tested to verify proper connection and operation of the components 155.

If, at step 641, the installation is not elevated (such as installation location 513 illustrated in FIG. 5), then the equipment rack 150 is lowered to the height of the installation location in the rack frame using an adjustable skid ramp 130 in step 629. A higher end of the adjustable skid ramp 130 is adjusted to the height of the roller platform 125 in the movable cart 120, and a lower end of the ramp 130 is adjusted to the height of the roller platform 140 when resting on the floor of the premises. Roller platform 140 is designed to have the same height as the bottom of the installation location 513 in the rack frame 510. Alternatively, the height of the roller platform 140 is adjustable and is adjusted to match the height of the rack frame prior to loading the equipment rack 150 onto the roller platform 150.

The movable cart 120 and equipment rack 150 are positioned at the higher end of the ramp 130. One or more of the safety bars 127 are removed from the movable cart 120 to provide a path for moving the loaded equipment rack 150 onto the ramp 130, and the equipment rack 150 is transferred off the movable cart 120 and onto the ramp 130. While the weight of the equipment rack 150 is supported on the ramp 130, the equipment rack 150 is moved toward the lower end of the ramp 130 to lower the equipment rack 150 to the height of the roller platform 140, at the same height as the installation location 513. The equipment rack 150 is moved off the ramp 130 and onto the roller platform 140. In an alternative embodiment, the roller platform 115 is removed from inside the shipping crate 110 to be used in place of roller platform 140.

The movable cart 120 is used to move the equipment rack 150 through narrow aisles between adjacent rows of rack frames; however, given sufficient space at the installation premises for positioning the shipping crate 110 near the installation location 513, the equipment rack 150 can be transferred directly from the shipping crate 110 to the ramp 130, and then to the roller platform 140 in order to lower the equipment rack 150 to the installation height.

Once the equipment rack 150 has been lowered to the roller platform 140, the equipment rack 150 is at the same height as the installation location 513. In step 631, the equipment rack 150 can then be transferred from the low profile roller platform 140 into the installation location 513 by sliding the equipment rack 150 over the roller bearings of roller platform 140. The bearings of roller platform 140 thus reduce friction between the equipment rack 150 and the rigid plate of roller platform 140 while the equipment rack 150 is being transferred to the installation location 513. In some embodiments, transferring the equipment rack 150 to the installation location 513 involves sliding the equipment rack 150 over multiple roller platforms.

Step 631 may also involve rotating the equipment rack 150 around a vertical axis on the low profile roller platform 140 in order to position the equipment rack 150 for insertion into the installation location 513. For example, the equipment rack 150 may be transported down an aisle between rack frames with the longitudinal axis of the footprint of the equipment rack 150 aligned with the direction of travel, then moved onto the roller platform 140 and rotated prior to insertion into the installation location 513.

In step 645, the loaded equipment rack 150 is installed in the rack frame 510 in the installation location 513, which includes fastening the equipment rack 150 to the rack frame 510, and cabling and testing the components 155. In one embodiment, the steps of process 600 can be reversed to remove the loaded equipment rack 150 from an upper or lower installation location in the rack frame 510. Thus, the equipment rack 150 can be later moved and installed in a different rack frame at the same or different installation premises according to the same process 600.

In sum, a loaded equipment rack is transported to an installation location by enclosing the equipment rack inside a shipment and container on top of a roller platform that reduces friction between the equipment rack and the interior floor of the shipment container. The roller platform thus facilitates removal of the equipment rack from the shipment container after delivery at the installation premises. Additional roller platforms and lifting devices are used at the installation premises to further transport the loaded equipment rack to its ultimate installation location.

An advantage of this approach is that the installation and testing of components in the equipment rack can be performed prior to transporting the loaded and tested equipment rack to the installation premises, reducing the amount of time for performing the installation process at the installation premises. Furthermore, any additional skilled personnel or equipment used for loading, cabling, and testing the components in the equipment rack do not need to be transported to the installation premises, since these steps are performed at the manufacturing or system integration facility.

Another advantage of this approach is that the equipment rack can be transported without using casters that are permanently attached to the equipment rack and that occupy vertical space when the equipment rack is installed in the rack frame. By implementing the techniques described herein, equipment racks can be spaced more closely in the rack frames, allowing for higher equipment density.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

While the preceding is directed to embodiments of the present disclosure, other and further embodiments of the disclosure may be devised without departing from the basic scope thereof, and the scope thereof is determined by the claims that follow.

The invention claimed is:

1. A roller platform system for transporting a load, comprising:
   a roller platform including:
      a first set of bearings arranged in a plurality of columns of bearings mounted on a first rigid plate, wherein the first set of bearings is configured to reduce friction between the load and a floor of a shipment container and is further configured to allow the load to move in at least a first direction and a second direction perpendicular to the first direction, and wherein at least one bearing included in the first set of bearings comprises a housing and a spherical ball that extends above a height of the housing, and
      a set of one or more bars or tubes, each of the one or more bars or tubes being mounted on the first rigid plate between, and in a direction parallel to, two adjacent columns of the plurality of columns of bearings mounted on the first rigid plate, wherein the one or more bars or tubes have a fixed height relative to the spherical ball that is lower than a height of a top of the spherical ball and higher than the height of the housing;
   a movable cart including a second set of bearings configured to receive the load from the roller platform; and a ramp configured to lower the load from one of the roller platform or the movable cart to a lower location.

2. The roller platform system of claim 1, wherein the movable cart further comprises:
a second rigid plate, wherein the second set of bearings is mounted on the second rigid plate, and wherein the second set of bearings is configured to transfer the weight of the load to the second rigid plate; and
a set of casters coupled to the second rigid plate and configured to reduce friction between the second rigid plate and a floor by transferring the weight of the load to the floor.

3. The roller platform system of claim 2, wherein the movable cart further comprises:
a set of rails coupled to the second rigid plate and configured to restrict movement of the load relative to the second rigid plate.

4. The roller platform system of claim 2, wherein the movable cart further comprises:
one or more removable safety bars configured to prevent the load from sliding off the movable cart.

5. The roller platform system of claim 4, further comprising one or more pegs configured to secure the one or more removable safety bars on the movable cart.

6. The roller platform system of claim 1, further comprising a second roller platform configured to receive the load from the ramp, wherein the second roller platform comprises a third set of bearings configured to support the load.

7. The roller platform system of claim 6, wherein a first end of the ramp is adjustable to a height of the first roller platform when the first roller platform is in the shipment container, and wherein a second end of the ramp lower than the first end is adjustable to a height of the second roller platform.

8. The roller platform system of claim 1, further comprising a lifting device configured to elevate the load to a height of an installation location for the load by elevating the shipment container while an equipment rack is on the first set of bearings in the shipment container.

9. The roller platform system of claim 1, further comprising a lifting device configured to elevate the load to a height of an installation location for the load by elevating the movable cart while an equipment rack is on the second set of bearings of the movable cart.

10. The roller platform system of claim 1, wherein the load comprises an equipment rack, and wherein the shipment container is configured to enclose the equipment rack after installation of one or more components in the equipment rack.

* * * * *